United States Patent [19]

Foster

[11] 4,146,830

[45] Mar. 27, 1979

[54] AUTOMATIC ELECTRIC BATTERY CHARGING APPARATUS

[75] Inventor: George W. Foster, Bolton, England

[73] Assignee: Chloride Group Limited, London, England

[21] Appl. No.: 775,553

[22] Filed: Mar. 8, 1977

[30] Foreign Application Priority Data

Mar. 9, 1976 [GB] United Kingdom ............... 9393/76

[51] Int. Cl.² .............................................. H02J 7/04
[52] U.S. Cl. ....................................... 320/23; 320/32; 320/39
[58] Field of Search ...................... 320/22, 23, 24, 37, 320/38, 39, 40, 32, 33

[56] References Cited

U.S. PATENT DOCUMENTS 3,979,658 9/1976 Foster ................................ 320/39 X
3,992,658 11/1976 Bechtold et al. .................. 320/39 X
4,052,656 10/1977 Lavell et al. ...................... 320/37 X Primary Examiner—Robert J. Hickey
Attorney, Agent, or Firm—Watson, Cole, Grindle & Watson

[57] ABSTRACT

A battery charger which provides a constant current charge during a first part of the charging period and a taper charge during the remainder of the charging period. The taper charge characteristic is obtained by decreasing a set value for the charging current by a step of predetermined size each time the battery voltage has risen by a step of predetermined size, provided that the battery voltage is above a certain threshold; below this threshold, the set value has its maximum value, resulting in the constant current part of the charge. The charging current is regulated to be equal to the set value, regardless of variations in mains supply voltage. The charge is terminated when the time between steps in battery voltage exceeds a predetermined value.

19 Claims, 7 Drawing Figures

AUTOMATIC ELECTRIC BATTERY CHARGING APPARATUS

This invention relates to automatic electric battery charging apparatus.

It is well known that during the later stages of charge when gassing occurs the charging current must be restricted to a value substantially less than that which would be acceptable during the early stages. The initial current when the battery voltage is low may be two or three times what would be permissible during the final stages of the charge. In a simple charger known as a taper charger comprising a transformer and a bridge rectifier and an impedance such as a resistor or an inductor to cause the output voltage of the charger to fall as the charging current increases, this fall of current is very simply obtained, but is very far from following the optimum variation during the charge. It is preferable to keep the charging current substantially constant at a maximum value throughout the majority of the duration of the charge and only reduce it comparatively steeply towards the end of the charge when gassing occurs. Such a characteristic cannot of course be achieved by a simple taper charger. In addition of course in a simple taper charger it is inevitable that both the charging current and the battery voltage will vary with fluctuation of supply voltage.

Various proposals have therefore been put forward for stabilizing or controlling the value of the current during the charge. The best known such charger program uses the so-called IUI characteristic which comprises three stages. The first stage is at a relatively high rate of charge during which the current is held constant against variations in mains or battery voltages or other factors. The second stage starts when the battery is gassing moderately and has reached a predetermined voltage, typically 2.35 volts per cell in the case of a lead acid battery. From this point the battery voltage is held constant and the charge current accordingly diminishes. The final stage starts when the charge current has dropped down to a predetermined finishing rate. The current is then held constant at this finishing rate until the charge is terminated by a timing device either set for a total charge time, or set for a predetermined charge time at the finishing rate.

The need to predetermine a final current level with the above program is a disadvantage. It narrows the range of battery sizes to which a given charger is applicable and furthermore there exists the possibility, with an old battery, that the current may not drop down to the predetermined value to trigger the final stage for charge termination.

According to the present invention automatic electric battery charging apparatus includes means for monitoring the charging current and adjusting it to a predetermined value, and means responsive to the battery voltage for progressively reducing the said value in accordance with a function of the battery voltage so that the current is progressively reduced as the voltage rises progressively at least during the part of the charge in which gassing occurs and the battery voltage would rise comparatively rapidly at constant current.

According to a further aspect of the invention automatic electric battery charging apparatus includes a voltage comparator arranged to compare a reference voltage with a control signal varying with battery voltage, means for repeatedly increasing the reference voltage by a step relatively to the battery voltage whenever the control signal exceeds the reference voltage, and means for decreasing the charging current by a step whenever the reference voltage is increased by a step. Conveniently the control signal is kept in constant relation to the battery signal. The steps of voltage may be substantially equal.

The initial reference voltage is preferably so chosen that the battery voltage signal only reaches it after the expiry of the major part of the duration of the charge. Thus as indicated above the charge current may be maintained at a constant maximum value for the initial major part of the charge and it is only in the latter part of the charge when gassing occurs that it is necessary to reduce the charging current in order to avoid damage to the battery.

The means for producing a reference voltage may comprise a voltage comparator comparing a signal proportional to battery voltage with the reference voltage, a clock controlled by the said comparator to emit a pulse when the battery voltage signal exceeds the reference voltage, and a digital-analogue converter producing an analogue reference signal corresponding to the number of pulses emitted by the clock. The digital analogue converter may comprise a binary weighted resistance network connected to a binary reference counter to change the output voltage (or current) of the network step-by-step.

The apparatus may include an inverter serving to convert a rising reference signal corresponding to battery voltage, to a falling reference signal by which the charging current is controlled. It may also include a current signal voltage comparator serving to compare a signal corresponding to actual charging current, with the falling reference signal, and decrease the charging current if the former exceeds the latter and vice versa.

Where the apparatus is for charging lead acid batteries the reference voltage may be increased by steps equivalent to not more than 0.020 volts per cell.

Where the apparatus includes means for generating a reference signal and for repeatedly increasing the reference voltage by a step relatively to the battery voltage whenever the control signal exceeds the reference voltage it may also include means for initiating termination of a phase of the charge when the time interval between steps exceeds a predetermined value. This feature per se is described in of the present applicat's U.S. Pat. No. 3,979,658. In general the final time interval may be chosen so as to render it unnecessary to provide an additional equalising charge and in this case the termination of the said phase of the charge is in fact complete switching off of the charge. The duration of the final interval may be not less than half an hour.

The means for terminating the charge (or a phase of it) may include an interval timer counter arranged to be reset whenever the reference voltage is increased by a step, and fed from an oscillator to count time and arranged to initiate termination of a phase of the charge if and when it reaches a predetermined count. Preferably the terminating means is rendered inoperative until the battery voltage exceeds a predetermined value, for example in the case of lead acid batteries, a value of 2.35 volts per cell.

Conveniently, where the charge current is derived from an a.c. supply, as is normal, the magnitude of the charging current is controlled by the phase control of the firing of one or more thyristors and in this case the termination of the charge may be effected by discontinuing such firing.

The apparatus may also include means responsive to charging current for switching off the supply when the charging current falls below a predetermined value, for example due to disconnection of a battery. The switching off of the supply in these circumstances may be controlled by the same thyristors that control the magnitude of the charging current and if desired the termination of the charge.

The invention may be put into practice in various ways, but one specific embodiment will be described by way of example, with reference to the accompanying drawings, in which.

Figure 7:
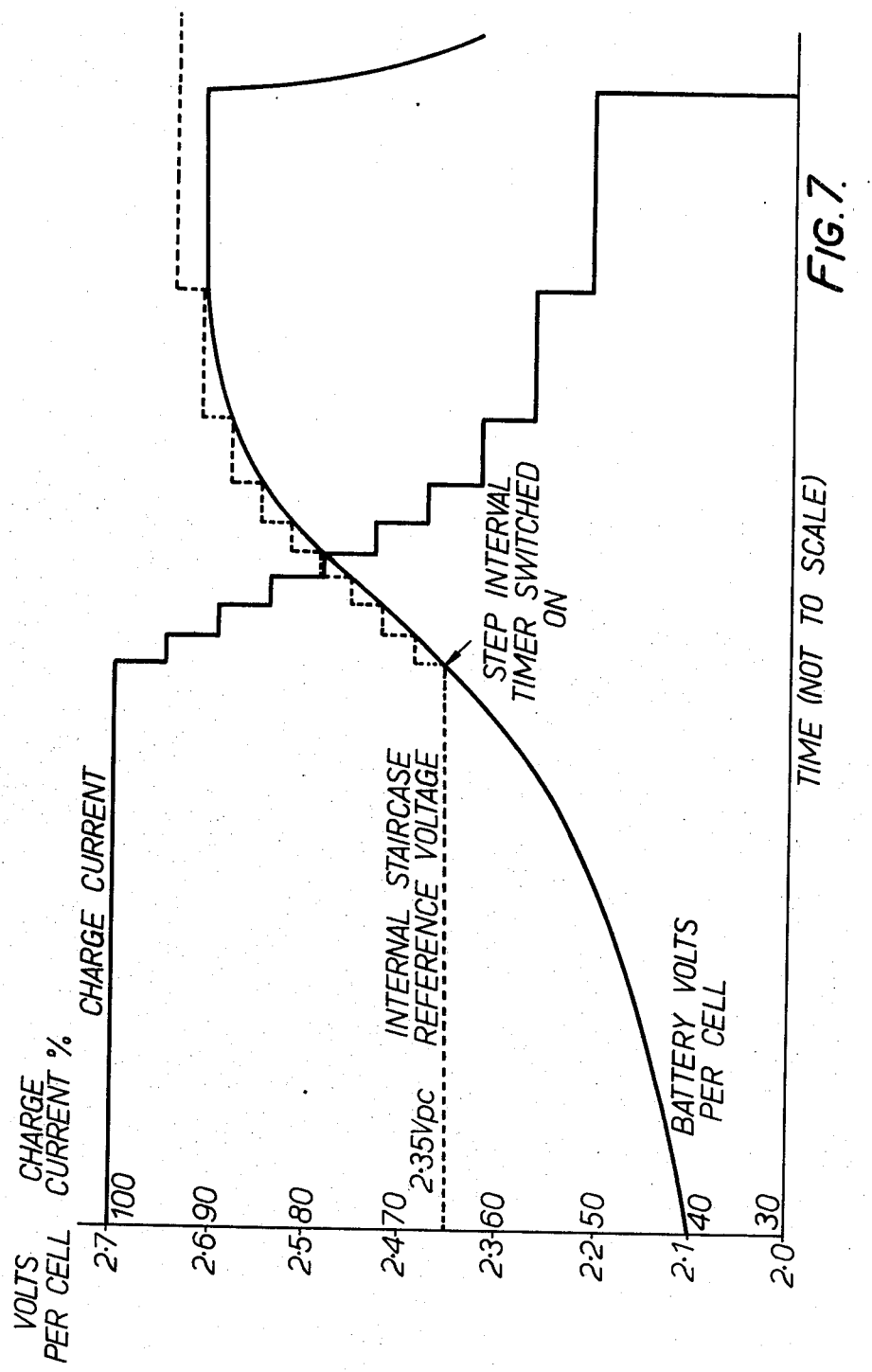

FIG. 7 comprises curves of battery voltage and charging current plotted against time.

The embodiment to be described incorporates substantial parts of the apparatus specifically described in the specification referred to above. That specification described a charger in which the charge (or the phase of it) is terminated in response to the rate of rise of a control signal, corresponding to the battery voltage compensated for variations of AC supply voltage. Accordingly, the apparatus automatically switches off the charger when the battery is substantially fully charged, irrespective of considerable variation of the supply voltage. This is achieved in the prior arrangement without the necessity for controlling the voltage, and avoids the expense of a stabilised voltage suppy which could be somewhat costly if the current to be controlled represents kilowatts of power. There are, however, applications in which it is important to be able to complete a charge as quickly as possible, or to be able to rely on completing a charge in a predetermined time irrespective of fluctuations of AC supply voltage. Thus if, as in the prior specification referred to, the charging current, and hence the time taken to complete a charge, varies with the AC supply voltage, it will be necessary to design the charger to handle the charging current at the maximum supply voltage without damage to either the battery or the charger, but it will only be possible to rely upon it to complete a charge in the time required at the minimum AC supply voltage.

The present invention incorporates control of the charging current so as to be substantially independent of AC supply voltage over a considerable range, and modifies the charging current as the charge proceeds so as to decrease in accordance with the increase of battery voltage.

Figure 1:
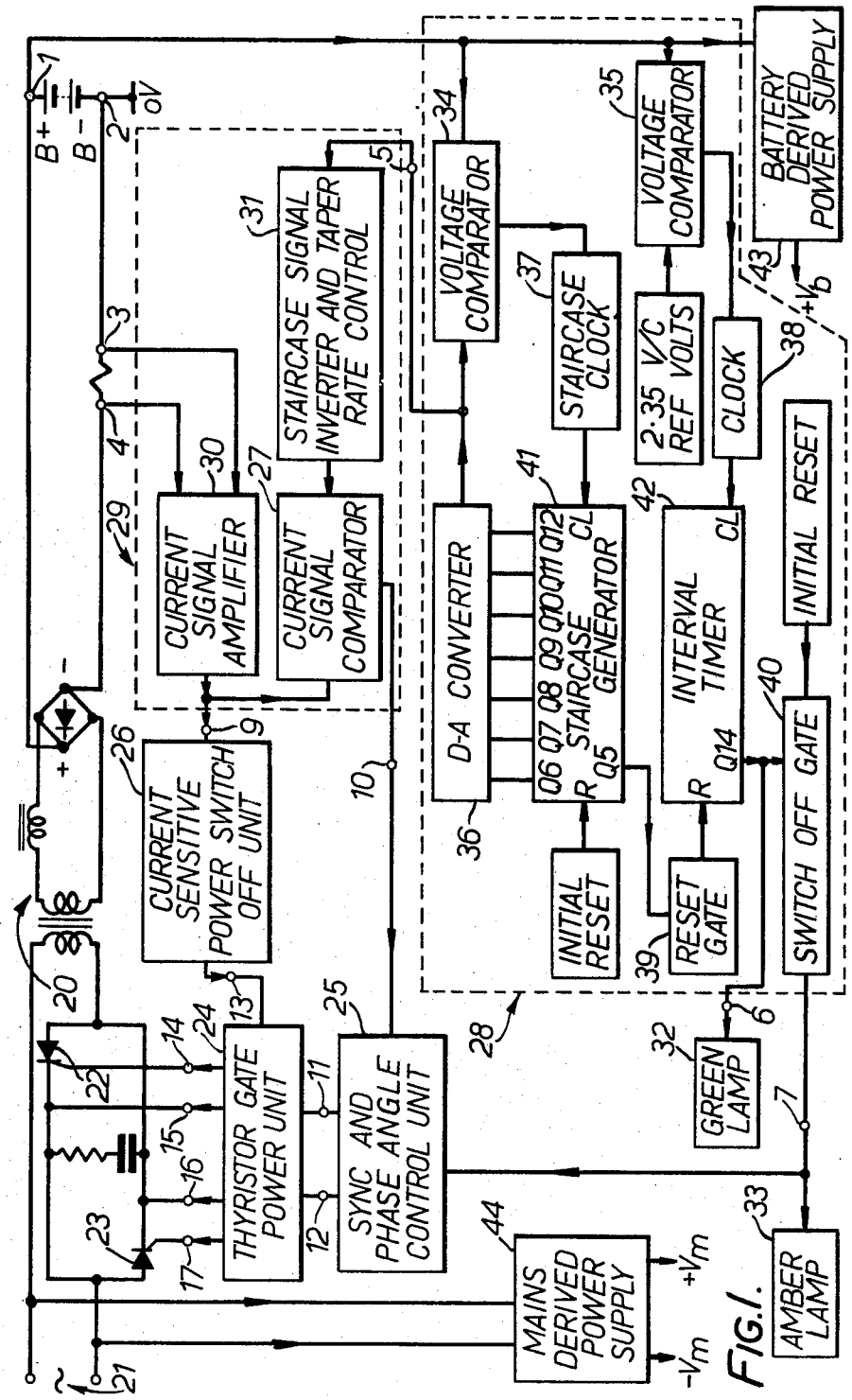
FIG. 1 is a block diagram of an automatic electric battery charger embodying the invention.

FIG. 1 of the drawings is a block diagram in which reference numerals indicate connections between different blocks or parts of the circuit and the signals passing through such connections, details of the various blocks being shown individually in FIGS. 2 to 6.

The basic charger comprises a conventional transformer, choke and rectifier arrangement 20. Power to the charger from an AC supply 21 is controlled by two inverse parallel thyristors 22 and 23 arranged to regulate the AC input voltage to the transformer. A battery voltage signal is taken from the charger output terminals 1–2 and a charge current signal is taken from a shunt 3–4 connected in series with one of the charging cables.

Figure 5:
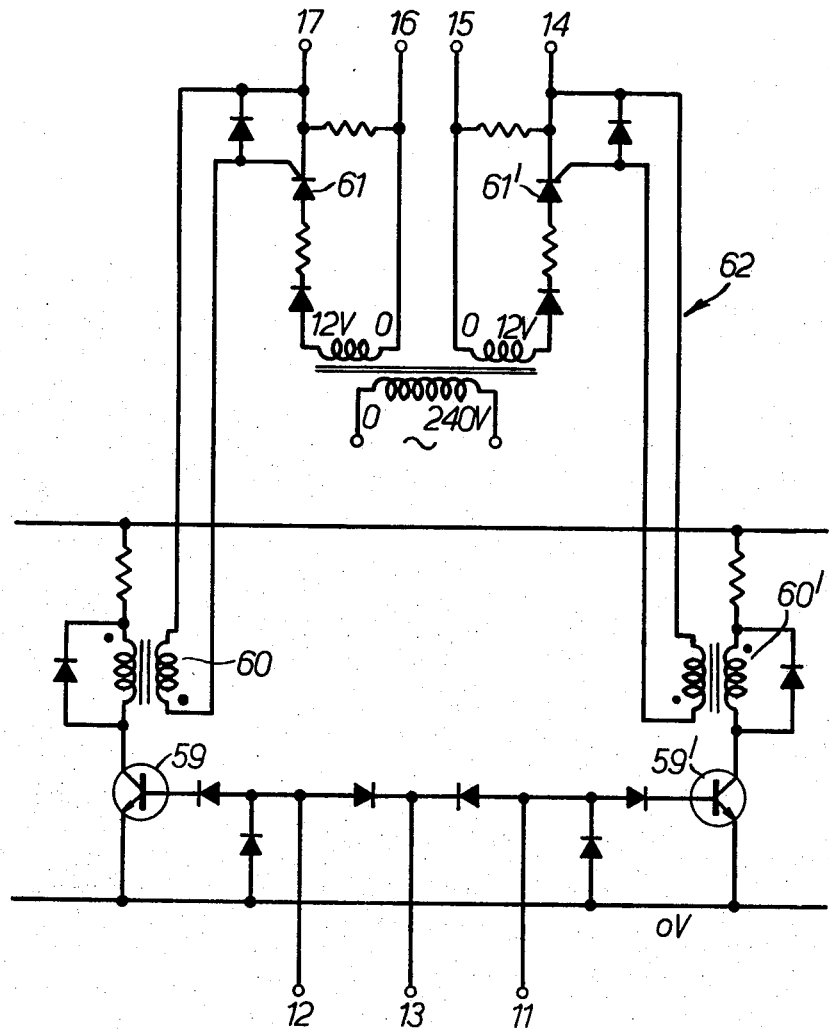
FIG. 5 is a circuit diagram of the thyristor gate power unit.

The thyristors 22 and 23 are fired by current pulses in each of two gate circuits 14, 15 and 16, 17. These pulses are generated by a thyristor gate power unit 24 (FIG. 5). The starting point of each pulse within the mains voltage cycle period is controlled so as to vary the phase angle of firing of the thyristors to adjust the average voltage applied to the primary winding of the transformer in accordance with the charge current requirements.

Figure 4:
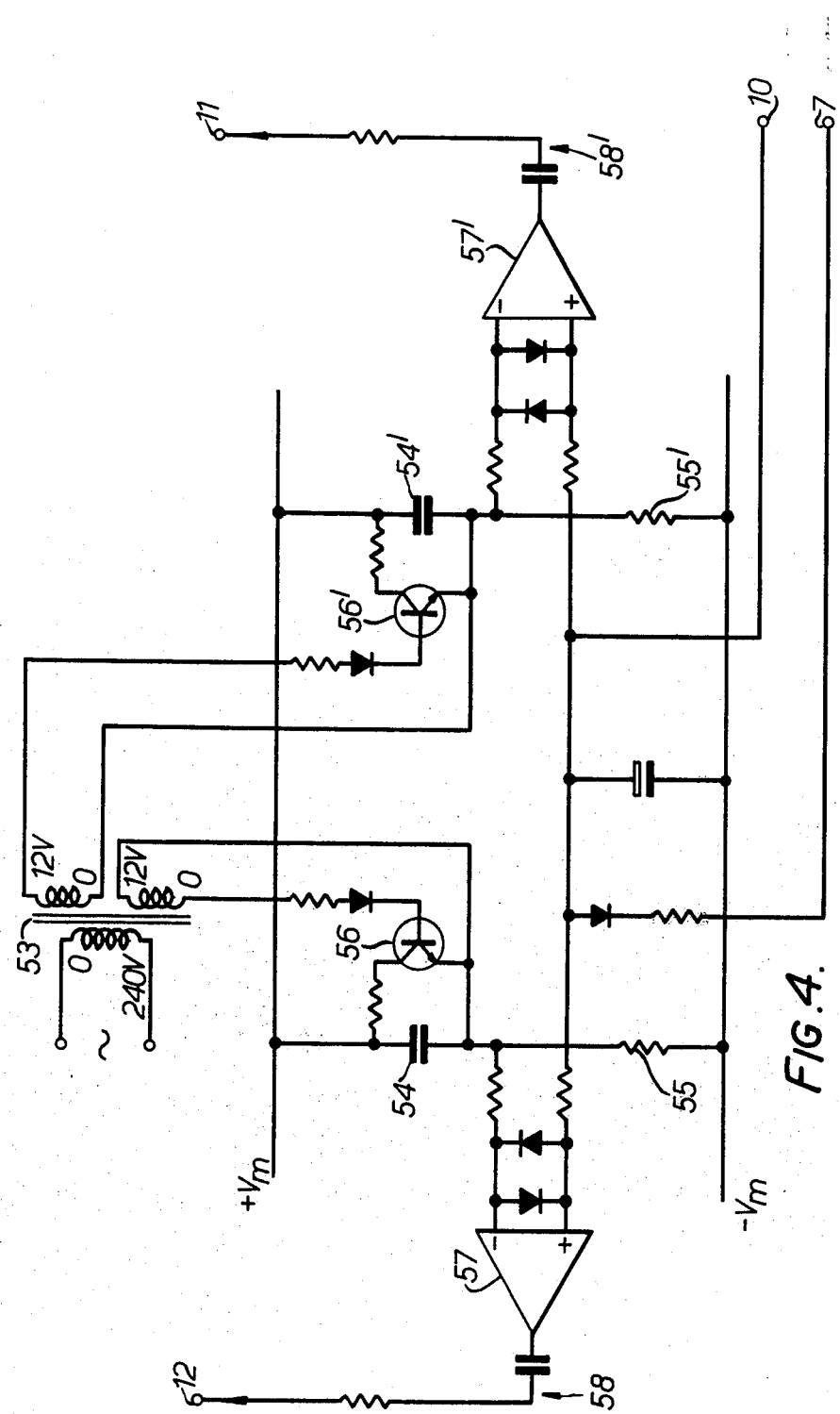
FIG. 4 is a circuit diagram of the synchronisation and phase angle control circuit.

The thyristor gate power unit receives three signals 11, 12 and 13. The signals 11 and 12 are low power voltage pulses which switch on the gate current pulses at the appropriate point in the mains voltage cycle. They are provided by a synchronization and phase control unit 25 (FIG. 4). The signal 13 occurs whenever the battery is disconnected, and stops the thyristor gate current pulses occuring. It is supplied by a current sensitive switch-off unit 26 (FIG. 6) and is in the form of a short circuit placed across the inputs of the signals 11 and 12.

Figure 2:
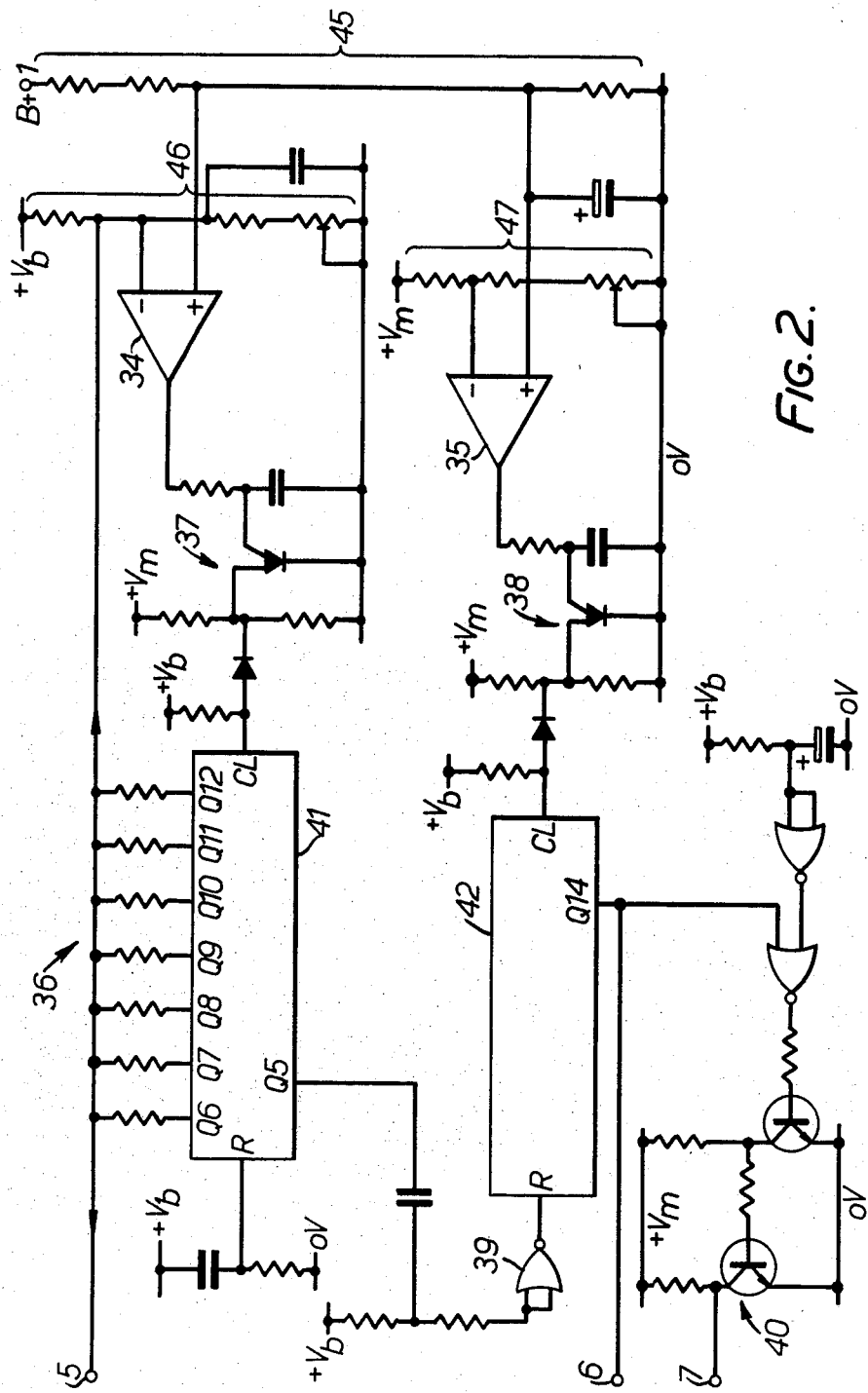
FIG. 2 is a more detailed circuit diagram of the reference staircase voltage generator and interval timer counter.
Figure 3:
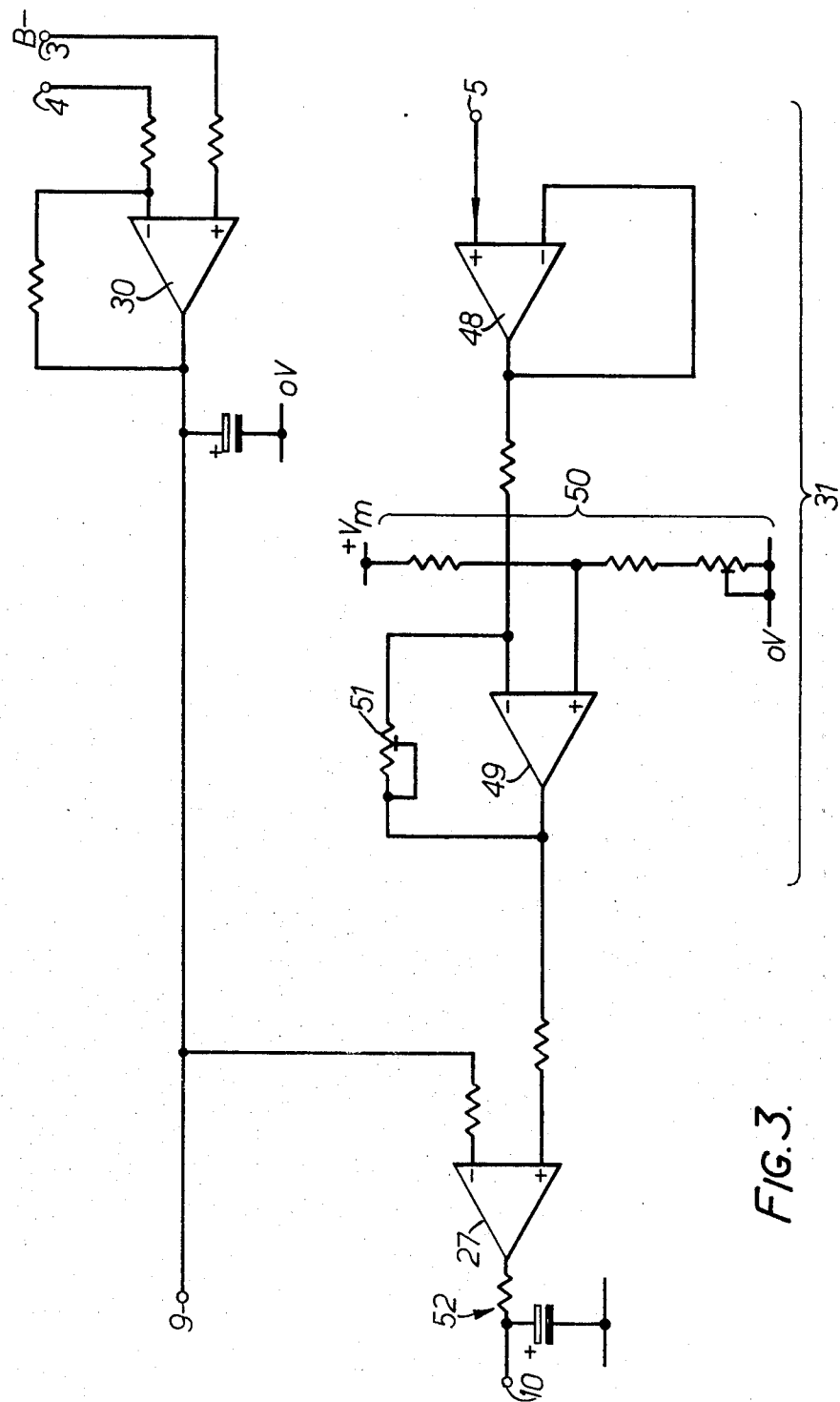
FIG. 3 is a circuit diagram of the current control circuit.

The synchronization and phase angle control unit 25 itself receives two signals 10 and 7. The signal 10 is a DC voltage the amplitude of which controls the time of occurrence of the signals 11 and 12 in the mains voltage cycle. It is supplied by a current signal comparator 27 (FIG. 3). The signal 7 is the charge termination signal, and is in the form of a short circuit placed across the input of the signal 10; it is supplied by a dV/dt unit 28 (FIG. 2).

Figure 6:
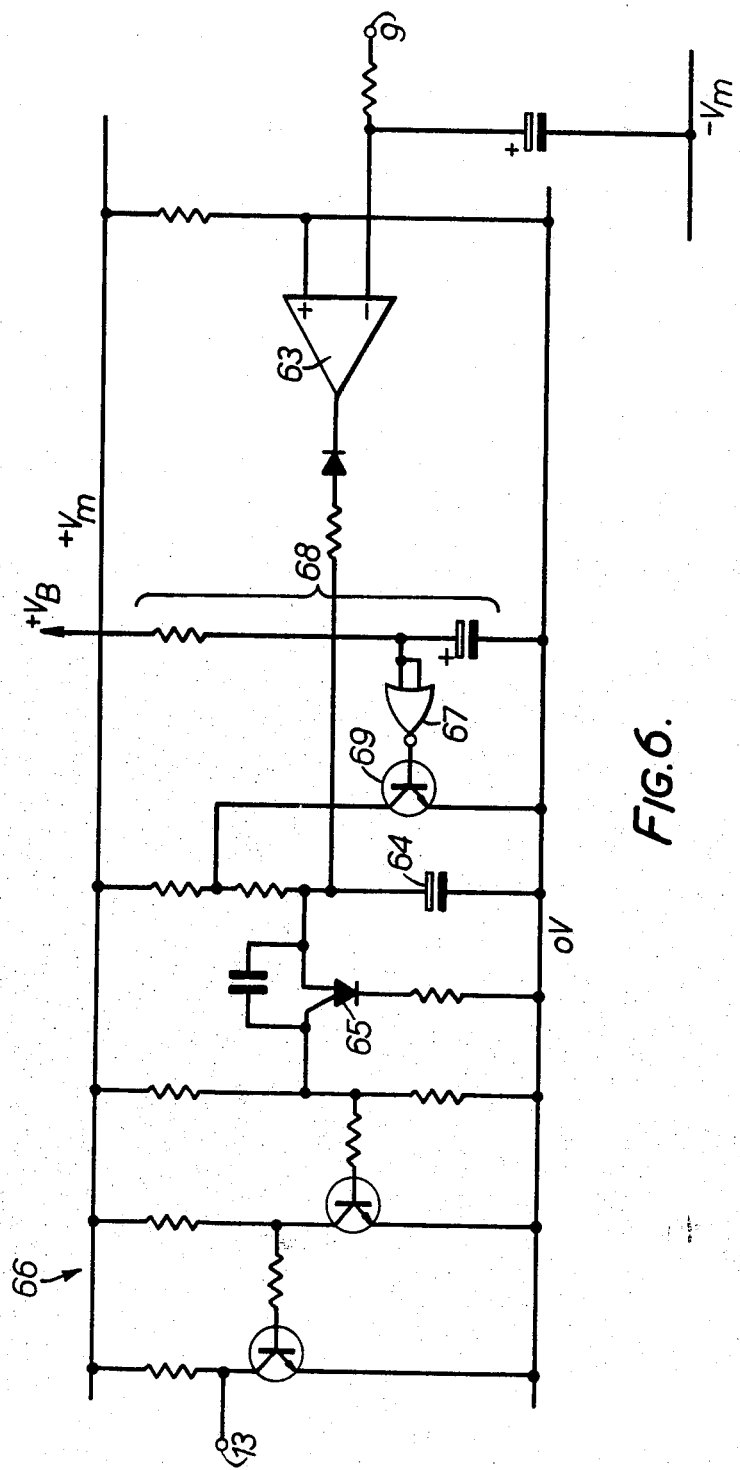
FIG. 6 is a diagram of the current sensitive power switch-off unit.

The current signal comparator 27 is part of the current control logic 29 (FIG. 3), which also includes a current signal amplifier 30 connected across the charge current shunt 3–4 and a staircase signal inverter and taper rate control 31 connected to receive a signal 5 from the dV/dt unit 28. The comparator 27 compares the DC voltage outputs of the other two units 30 and 31, representing the charging current and the inverted battery voltage, and adjusts the signal 10 in accordance with the result of the comparison to vary the charging current to maintain equilibrium between its two inputs. In addition the output voltage signal 9 of the current signal amplifier 30 is used as the operating signal for the current sensitive power switchoff unit 26 (FIG. 6).

The dV/dt unit 28 (FIG. 2) receives the battery voltage signal 1 and delivers three output signals 5, 6 and 7. The signal 5, delivered to the current control logic 29, is in the form of a gradually rising staircase reference voltage which is subsequently inverted by the staircase signal inverter and taper rate control 31 to form a gradually decreasing staircase reference voltage. The rate of decrease depends on the taper rate control 31 and on the rate of rise of battery voltage. The signals 6 and 7 are digital voltage signals which occur in antiphase with each other to operate amber and green indicating lamps 32 and 33 with the signal 7 additionally terminating the charge. Thus the amber lamp 32 indicates "charge in progress" and the green lamp 33 indicates "charge complete."

The dV/dt unit 28 comprises a number of subsections. The battery voltage 1 is applied to two voltage comparators, a staircase comparator 34 comparing it with the rising staircase voltage 5 and a timer comparator 35 comparing it with a fixed reference voltage of 2.35 volts per cell. The rising staircase voltage 5 is obtained from the output of a digital to analogue (D-A) converter 36 connected to the outputs of a staircase generator binary counter 41. The latter receives clock pulses from a staircase clock generator 37 which in turn is switched on by the output voltage of the staircase voltage comparator 34 each time the battery voltage signal 1 exceeds the D-A converter staircase voltage output 5. Thus the staircase voltage 5 closely follows the battery voltage signal 1.

The timer comparator 35 switches on a timer clock 38 so as to drive an interval timer binary counter 42 when the battery voltage 1 reaches the equivalent of 2.35 volts per cell. This counter then counts up at a fixed rate during the periods when the staircase generator clock 37 is switched off. Each time a new voltage step is generated by the staircase counter 41 a reset gate 39 resets the timer counter 42 back to zero. Thus the latter times the intervals between the staircase voltage steps. The counting rate of the timer clock 38 and counter 42 is preset so that after a step interval of a predetermined duration the last stage of the counter 42 changes from a low state '0' to a high state '1' to switch on the green lamp 32 and switch off, via a switch-off gate 40, the charge and the amber light 33 (as in the prior specifications referred to above).

Two stabilised power supplies 43 and 44 are provided, the first operating on battery power and the second on mains power. The battery powered supply 43 provides power (shown as $+V_b$) for the counters and associates digital logic gates and resistor networks so as to enable any counts to be retained during mains power interruptions. The mains powered supply 44 provides power (shown as $\pm V_m$) for the remainder of the controller logic circuits where no memory of previous states is required.

Reference Staircase Voltage Generator and Step Interval Timer (dV/dt Unit 28) — FIG. 2

The battery voltage 1 is applied through a resistor proportioning network 45 to present the voltage equivalent of two cells to the non-inverting inputs of two operational amplifiers which form the staircase and timer comparators 34 and 35 to control the operation of two programmable unijunction oscillators which form the clocks 37 and 38. The inverting input of the comparator 34 receives the staircase voltage output 5 of the D-A converter 36 whose initial value, when the count in counter 41 is zero, is adjusted by a potential divider 46 to start the clock 37 when the battery voltage 1 reaches the required taper starting voltage. The inverting input of the comparator 35 receives a reference voltage adjusted by a potential divider 47 to start the clock 38 at a battery voltage of 2.35 V.p.c. The two clocks operate the staircase and timer binary counters 41 and 42 which are of the complementary MOS (C/MOS) type.

The binary counter 41 receives clock pulses from the clock 37 and begins to count up to generate the rising staircase waveform whenever the output of the comparator 34 is in the high '1' state, that is whenever the proportion of battery voltage at the noninverting input exceeds the value of the staircase voltage at the inverting input. The staircase voltage is incremented by one step of typically 22 mV after each set of 32 clock pulses when the stage 6 (Q6) of the counter 41 changes state. The change of state Q6 coincides with the change from a '1' to a '0' state of state 5 (Q5) giving a negative transition voltage signal which operates the reset gate 39 connected to the timer binary counter 42. Thus each time a staircase step occurs a reset pulse is applied to the reset input of the timer counter 42.

The timer counter 42 receives clock pulses from the clock 38 continuously when the battery voltage 1 is in excess of 2.35 V.p.c. and attempts to count up to change the state of the stage 14 (Q14) to stop the charge. A total count of 8,192 is required for this purpose and at the clock rate used in the present case corresponds to a total time of 32 minutes. Thus the charge is terminated when the time between reset pulses, and thus the duration of a staircase voltage step, is 32 minutes or more.

The Q14 output of the timer counter 42 provides the voltage signal 6 to operate the green lamp 32 and the signal 7, via the switch off gate 40, to switch off the charge and the amber lamp 33. The switch-off gate 40 includes a transistor buffer arrangement to prevent feedback of the mains power supply into the battery powered sections when the battery is disconnected.

Charging Current Control Logic 29 — FIG. 3

This section comprises basically two operational amplifiers 48 and 49 which form the staircase inverter and taper control unit 31, and also the current signal comparator 27 and the current signal amplifier 30, in the form of two further operational amplifiers.

The amplifier 30 has its two inputs connected across the charge current shunt 3-4 and amplifies the shunt voltage signal by a factor of 22. The amplifier output is smoothed to provide the signal 9.

The amplifier 48 is arranged as a voltage follower to provide a buffer between the staircase output of the D-A converter 36 and the current logic sections so as to prevent loading of the converter by the latter.

The amplifier 49 is arranged as a variable low gain inverting amplifier having three functions. Firstly, it inverts the rising staircase voltage signal 5 from the D-A buffer stage 48 so as to convert it to a falling staircase voltage. Secondly, it sets the initial value of the falling staircase voltage, by adjustment of a potential divider 50 on its non-inverting input, so as to set the value of the constant current during the first stage of the shaped charging characteristic. Thirdly, it sets the size of the falling staircase steps, by adjustment of a rheostat 51 in its negative feedback loop, so as to set the size of the current steps and thus the rate of taper of the shaped characteristic.

The amplifier 27 compares the falling staircase signal from the amplifier 49 with the amplified current signal from the amplifier 30 and gives a high '1' or a low '0' voltage output depending on whether or not the staircase signal is at a higher voltage level than the amplified current signal. The digital nature of the output of the amplifier 27 is integrated by a resistor-capacitor network 52 on its output to provide the thyristor phase angle control voltage 10. Whenever the staircase voltage is less than the amplified current signal voltage the control voltage 10 decreases so as to phase back the thyristors 22 and 23 and reduce the charge current, and vice versa.

Synchronisation and Phase Angle Control Unit 25 — FIG. 4.

This unit comprises two identical sections to provide a thyristor gating pulse in each half cycle period of the mains voltage in alternate sequence. Synchronisation to the mains voltage cycle is provided by a phasing transformer 53 with two secondary windings. The time variation of a thyristor gate pulse in a half cycle period is provided by the coincidence of the DC control voltage 10 with a negative going ramp voltage which runs for the duration of the half cycle period.

Each negative going ramp voltage is provided by a capacitor 54 or 54' in series with a resistor 55 or 55'. A transistor 56 or 56' driven from the phasing transformer short circuits the capacitor 54 or 54' during one half cycle and allows it to charge up to provide the negative ramp voltage during the other half cycle. The transistor connections to the two secondary windings of the phasing transformer 53 are arranged so that the negative ramps of the two sections occur in alternate half cycles. The negative ramp voltages are applied to the inverting inputs of two operational amplifier voltage comparators 57 snd 57'. The DC control voltage 10 is applied to the non-inverting inputs. Thus when coincidence occurs the output voltage of 57 (or 57') changes from a low '0' state to a high '1' stage. This change in DC level is converted to a short positive pulse by a capacitor-resistor differentiating network 58 or 58' connected to the voltage comparator output.

The charge termination signal 7 reduces the control signal 10 to a value below that reached by the negative going ramp at the limit of its excursion and thus prevents the occurrence of the gate pulses 11 and 12.

Thyristor Gate Power Unit 24 — FIG. 5

This unit boosts the thyristor gate pulses 11 and 12 to a sufficient power and duration to operate the thyristors 22 and 23 reliably in the presence of appreciable inductance in the charging circuit.

The thyristor gate signals 11 and 12 switch on a pair of transistors 59 and 59' to provide a pulse of energy through associated pulse transformers 60 and 60'. The pulse transformers 60 and 60' switch on a pair of small thyristors 61 and 61' in an auxiliary transformer power supply 62 to deliver gate power pulses lasting for the remainder of the half cycle.

The overriding signal 13 from the current sensitive switch-off circuit 26 reduces the thyristor gate signals 11 and 12 below the value required to operate the transistors 59 and 59' and therefore switches off the charger directly.

Current Sensitive Power Switch-Off Unit 26 — FIG. 6

This unit which, per se, forms the subject of the present applicant's British Patent Specification No. 9401/76, suppresses the firing of the main thyristors 22 and 23 to make the charger output plug electrically 'dead' when the battery is disconnected. It operates when the charge current falls below a predetermined threshold level.

An operation amplifier 63 compares the amplified current signal voltage 9 with a low value reference voltage of about 60 mV. In a typical example, in which the maximum charging current is 100A, this reference voltage might be equivalent to about 3½A charge current. When the charge current falls to a correspondingly low value the output of the amplifier 63 changes from a low state '0' to a high state '1.'

The output of the amplifier 63 when in the low state prevents the charging up of a capacitor 64 on the anode of a programmable unijunction transistor 65 and thereby prevents this device from triggering to the 'on' state. In the 'off' state the voltage on the gate of the transistor 65 is sufficient to drive a two stage transistor amplifier 66 so that the output signal 13 is in the high state and does not affect the thyristor firing circuits 24.

As soon as the battery is disconnected the output of the amplifier 63 goes high and the capacitor 64 of the programmable unijunction trigger circuit charges up to the trigger voltage to switch the transistor 65 'on.' In this state the gate voltage of the transistor 65 is too low to drive the transistor amplifier 66 and so the signal 13 changes to a low state to stop the thyristor gate pulses and switch the charger off.

An arrangement for dealing with the event of mains power interruptions is included in the circuit. This comprises an inverter gate 67 driven from the battery positive terminal 1 through a resistor-capacitor delay network 68 to operate a transistor 69 connected across part of the programmable unijunction capacitor charging circuit. When the mains power is restored the transistor 69 delays the operation of the latter circuit until the various other capacitors in the controller circuit have been charged. Thus if a battery is connected charging will recommence and the charging current signal will prevent operation of the trigger circuit. If no battery is connected the trigger circuit will operate after a further short delay and switch the charger off. In effect this arrangement allows a short time of about three seconds to test whether or not a battery is connected after the occurrence of a temporary mains failure.

This circuit and its operation are described in more detail in the companion specification referred to above, application No. 9401/76.

It is believed that the operation of the apparatus will in general be clear from the above description of the circuits.

At the start of the charge the initial output of the staircase signal inverter 31 is present to give the required high constant current value for the main part of the duration of the charge. The reference voltage provided by the potential divider 47 is chosen to correspond to a value of 2.35 volts per cell so that it remains above the battery voltage signal for the majority of the duration of the charge, and indeed until the battery voltage begins to rise more steeply and gassing occurs. From this point the staircase output reference signal 5 gradually rises step-by-step and the inverter output gradually falls step-by-step, at a rate determined by its gain as set by the rheostat 51, and the charge current gradually reduces. This is illustrated (though not to scale) in FIG. 7 which shows the rising battery voltage in full lines, the reference voltage in dotted lines, and the falling charge current in full lines. When the current and battery voltage finally become constant and remain so for 32 minutes the signal 7 switches the charger off.

Throughout the charge the current is controlled to a predetermined value at any particular stage, so that the complete charge is independent of mains supply voltage within a substantial range. Accordingly the time taken to recharge a given battery in a given state of discharge will always be the same. Equally the charging current at a given stage of charge will not vary appreciably with factors such as the mains supply voltage so that it is possible to design the charger to supply the maximum charging current which the battery can safely accept at each point in the charge without fear that a rise of mains voltage will cause the current to rise and damage the battery.

Considerable economy of components is effected by employing the rising staircase reference voltage to terminate the charge and inverting it to control the current, rather than using separate components. In addition economy is effected by employing the same thyristors to control the magnitude of the charging current during the charge, and to switch off the supply at the end of the charge, as well as switching off the supply if the battery should be disconnected.

What we claim as our invention and desire to secure by Letter Patent is:

1. Automatic electric battery charging apparatus comprising a voltage comparator arranged to compare a reference voltage with a battery voltage signal varying with battery voltage, means for repeatedly increasing the reference voltage by a step relatively to the battery voltage whenever the battery voltage signal exceeds the reference voltage, and means for decreasing the charging current by a step whenever the reference voltage is increased by a step.

2. Apparatus as claimed in claim 1 in which the battery voltage signal is kept in constant relation to the battery voltage.

3. Apparatus as claimed in claim 1 in which the steps of voltage are substantially equal.

4. Apparatus as claimed in claim 1 in which the initial reference voltage is so chosen that the battery voltage signal only reaches it after the expiry of the major part of the duration of the charge.

5. Apparatus as claimed in claim 1 further comprising means for producing a reference voltage including a voltage comparator comparing the battery voltage signal proportional to battery voltage with the reference voltage, a clock controlled by said comparator to emit a pulse when the battery voltage signal exceeds the reference voltage, and a digital-analogue converter producing an analogue reference signal corresponding to the number of pulses emitted by the clock.

6. Apparatus as claimed in claim 5 in which the digital-analogue converter includes a binary weighted resistance network connected to a binary reference counter to change the output of the network step-by-step.

7. Apparatus as claimed in claim 1 further comprising an inverter serving to convert a rising reference signal corresponding to battery voltage, to a falling reference signal by which the charging current is controlled.

8. Apparatus as claimed in claim 7 further comprising a current signal voltage comparator serving to compare a signal corresponding to actual charging current, with the falling reference signal, and decrease the charging current if the former exceeds the latter and vice versa.

9. Apparatus as claimed in claim 1 in which, when it is used for charging lead acid batteries, the reference voltage is increased by steps of not more than 0.020 volts per cell.

10. Apparatus as claimed in claim 1 further comprising means for initiating termination of a phase of the charge when the time interval between steps exceeds a predetermined value.

11. Apparatus as claimed in claim 10 in which the termination of the said phase of the charge is complete switching off of the charge.

12. Apparatus as claimed in claim 11 in which the duration of the final interval of the charge is not less than half an hour.

13. Apparatus as claimed in claim 10 in which the means for terminating at least a phase of the charge includes an interval timer counter arranged to be reset whenever the reference voltage is increased by a step, and fed from an oscillator to count time and arranged to initiate termination of a phase of the charge if and when it reaches a predetermined count.

14. Apparatus as claimed in claim 13 in which the terminating means is rendered inoperative until the battery voltage exceeds a predetermined value.

15. Apparatus as claimed in claim 14 in which the predetermined value, in the case of lead acid batteries, is 2.35 volts per cell.

16. Apparatus as claimed in claim 1 in which the charging current is derived from an a.c. supply, and the magnitude of the charging current is controlled by the phase control of the firing of one or more thyristors.

17. Apparatus as claimed in claim 16 in which the termination of the charge is effected by discontinuing the firing of the thyristors.

18. Apparatus as claimed in claim 16 further comprising means responsive to charging current for switching off the supply when the charging current falls below a predetermined value.

19. Apparatus as claimed in claim 18 in which the switching off of the supply is controlled by the same thyristors which control the magnitude of the charging current.

* * * * *